Jan. 16, 1951  L. P. KNARREBORG  2,538,421
FEEDING APPARATUS
Filed Aug. 11, 1947  3 Sheets-Sheet 3
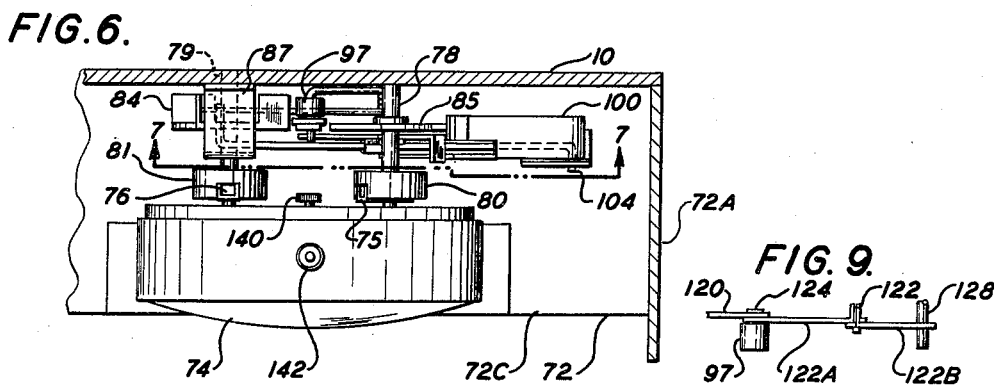
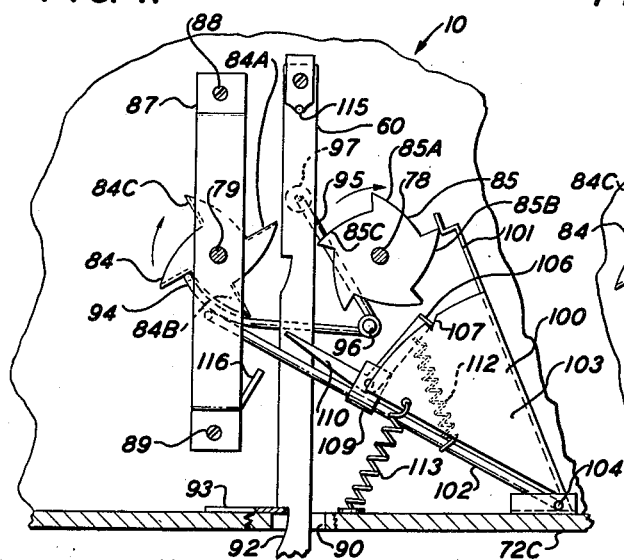
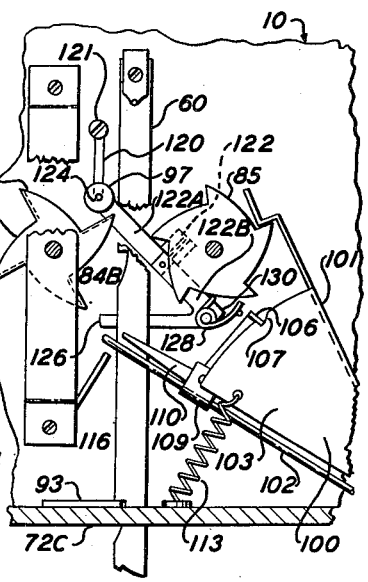
INVENTOR.
LEONARD P. KNARREBORG
BY
*Christie & Angus*
ATTORNEYS Patented Jan. 16, 1951

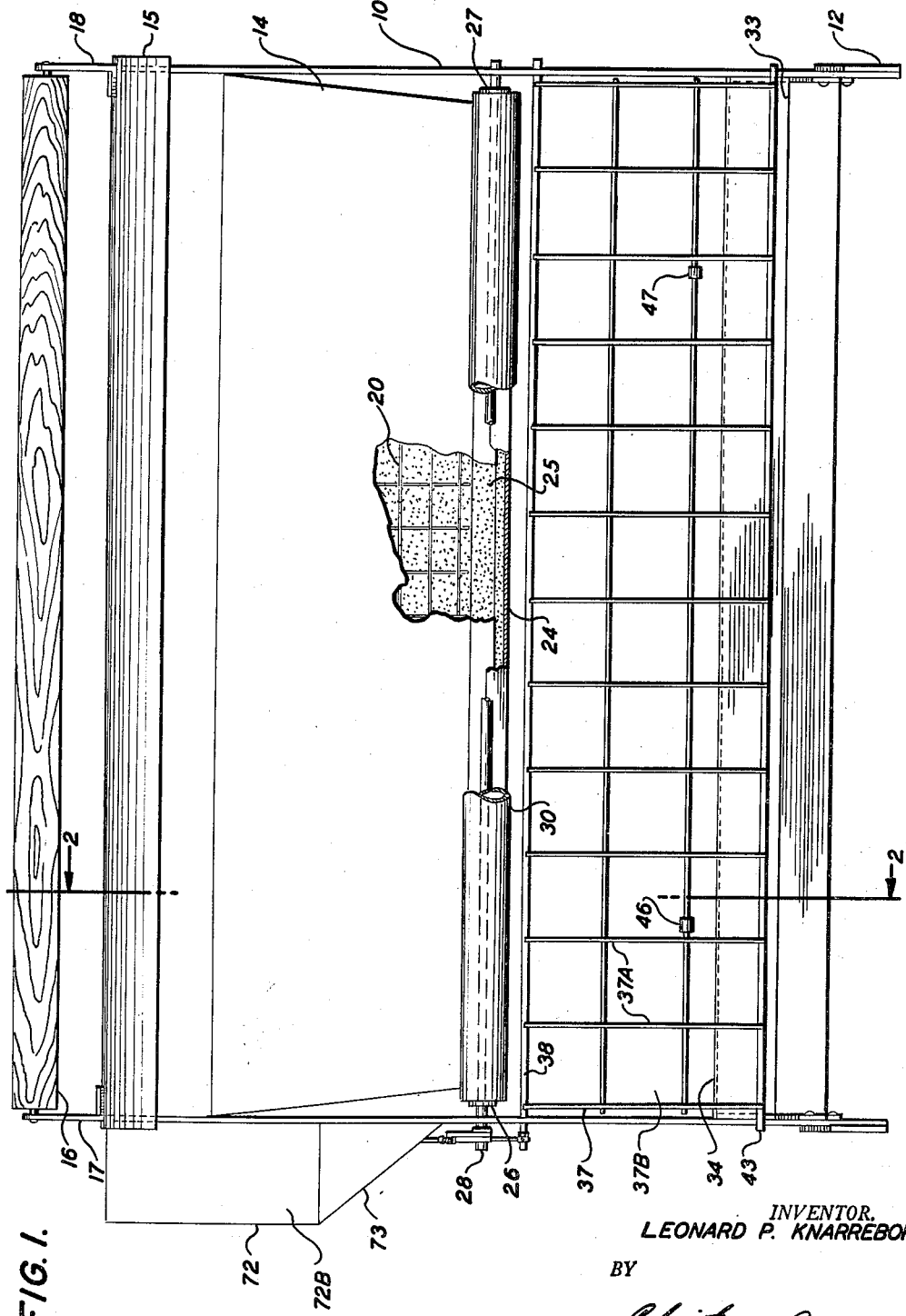

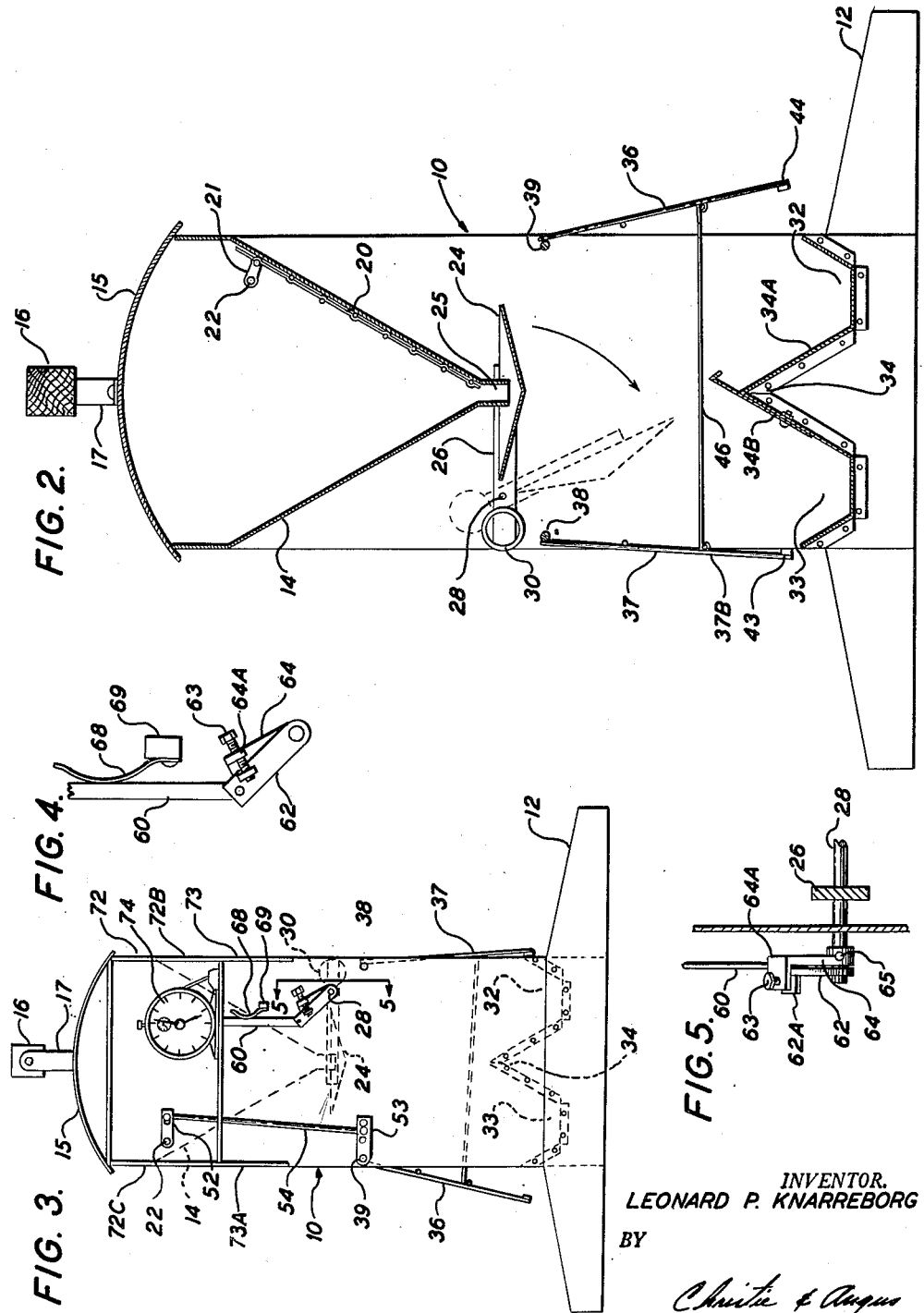

2,538,421

UNITED STATES PATENT OFFICE 2,538,421

FEEDING APPARATUS

Leonard P. Knarreborg, Altadena, Calif.

Application August 11, 1947, Serial No. 767,913

20 Claims. (Cl. 161—10)

This invention relates to automatic feeding apparatus and more particularly to automatic poultry feeding apparatus adapted to operate in such a fashion that twice a day grain or other feed will be discharged in measured amounts into a receptacle from which the poultry may obtain the same.

In semi-rural and suburban areas the raising of poultry is often indulged in as a hobby or avocation but not generally as a means of livelihood. Poultry raising of this character requires the same care as poultry raising on a large scale and includes the necessity of feeding twice daily at dawn and in the late afternoon. An object of my invention is to provide a simple and economical apparatus whereby the semi-daily feeding may be accomplished automatically so as to minimize the work associated with such a hobby. Although particularly adapted to relieve "white collar" poultry fanciers, the apparatus is equally suited to use in large poultry ranches.

These and other objects of the invention are accomplished by the provision of apparatus comprising feed storage means and feeding troughs and automatic means for transferring at preselected intervals a measured quantity of feed from the storage means to the feeding trough. This automatic means of transfer comprises in one embodiment a receiving bucket or trough in association with the storage means and adapted to receive feed therefrom and operable by a clock controlled mechanism to unload at twelve hour intervals into the feeding trough or troughs.

The invention may be more clearly understood from the following detailed description thereof taken in relation to the accompanying drawing in which:

Fig. 1 is an elevation of the assembled apparatus;

Fig. 2 is a sectional elevation taken on the line 2—2 of Fig. 1;

Fig. 3 is an end view of the apparatus as shown in Fig. 1;

Fig. 4 is a detail view of a portion of the apparatus as shown in Fig. 3;

Fig. 5 is a section taken on the line 5—5 of Fig. 3;

Fig. 6 is a plan view of the control mechanism which controls the discharge of feed into the feeding troughs;

Fig. 7 is an elevation taken on the line 7—7 of Fig. 6;

Fig. 8 is an elevation similar to that of Fig. 7 showing a modification of the control mechanism;

Fig. 9 is a detail view of a portion of the mechanism shown in Fig. 8;

Fig. 10 is a partial elevation of another embodiment of the control mechanism; and Fig. 11 is a view of an element of the modification of Fig. 10.

Referring to Figs. 1, 2 and 3, the apparatus comprises the framework 10 to which various elements of the apparatus are mounted and which is provided with a supporting stand 12. A storage hopper or bin 14 is suspended in the upper part of the framework 10 and is provided with a cover 15. A square bar 16 is pivotably mounted above the cover 15 by means of the brackets 17 and 18 and is adapted to prevent the poultry from roosting on top of the apparatus.

A screen agitator 20 is mounted within the bin 14 by an arm 21 and one or more additional arms not shown depending from the pivotable shaft 22 projecting longitudinally through the bin.

A receiving trough 24 is held beneath the bottom longitudinal opening 25 of the bin 20 by means of the support arms 26 and 27 which are pivotably mounted to the framework 10 by means of the shaft 28. A counter-weight 30 is affixed to and between the outer ends of the arms 26 and 27 for the purposes hereinafter set forth. The opening 25 in the bottom of the bin 14 extends the entire length of the bin and is adapted to discharge into the trough 24 which likewise extends the entire length of the bin beneath the opening 25. The trough 24 is supported at either end by means of the supporting arms 26 and 27 as described which are pivotably mounted to the framework 10 by means of the pivotable shaft 28. To obtain an even balance the counter-weight 30 also preferably extends the length of the bin 20 and is supported between the support arms 26 and 27.

In the lower portion of the framework 10 there is provided the two feed troughs 32 and 33 which are separated from each other by the ridge 34.

The grates 36 and 37 are pivotably mounted to the framework 10 by the shafts 38 and 39 respectively, and form a guard to keep the poultry out of the feed troughs. As shown in Fig. 1 the grate 37 comprises the evenly spaced vertical strips 37A, affixed to the shaft 38 and connected at their bottom ends by the horizontal rod 43. The horizontal bars 37B give the grate a webbed appearance. These longitudinal strips further insure that the chickens, etc., cannot gain access to the feeding troughs. The guard framework 36 is similarly constructed. The spaces between the vertical strips 37 and the horizontal strips 37B are adapted to permit a chicken or other bird or animal to insert his head therethrough in order to gain access to the feeding trough but at the same time preventing the passage of the whole body. The grates 36 and 37 are joined to each other by means of tie rods such as the tie rod 46 pivotably mounted to the lower horizontal strips 37B and 36B. To provide uniform action of the grates 36 and 37 throughout their length another connecting linkage 47 is provided adjacent the opposite end thereof from the linkage 46. As is shown in Fig. 2 grates 36 and 37 are so connected to each other by the tie or spacer rods 46 and 47 that one or the other (in this case the guard 36), is displaced from the side of the framework 10 a distance sufficient to prevent the chickens or the like from feeding from the trough 32.

As shown in Fig. 3 the shaft 22 to which the agitator 20 is mounted within the bin 14 is provided with a lever arm 52 on the exterior of the bin and the shaft 38 to which the guard 37 is pivotably mounted to the framework 10 is similarly provided with a lever arm 53. A tie rod 54 connects the ends of the lever arms 52 and 53 so that any rotation of the shaft 38 results in a like rotation of the shaft 22. Thus as chickens approach the two troughs 32 and 33 access to one or the other would be prevented by the outward displacement of one of the guard members. In order to feed the chickens push that guard member inwardly thereby forcing the opposite guard member outwardly. In this fashion the chickens themselves will cause the alternate displacement of one and then the other of the guard members which will result in a partial rotation of the shaft 38 and of the shaft 22 furnishing motivating means for the agitator 20 within the bin 14. This means of providing agitation within the bin 20 is a feature of the invention but is not essential thereto and may be included as a part of the apparatus or excluded therefrom without departure from the invention.

Referring more particularly to Figs. 3, 4 and 5 it is seen that the rotation of the receiving trough 25 about the axle 28 is controlled by means of the release arm 60, the function of which is more particularly described hereinafter. In Fig. 3, the control mechanism which actuates the release arm 60 is represented symbolically by a clock 62 and is illustrated and described in greater detail with relation to Figs. 6 and 7. The particular mechanism shown in Figs. 3, 4 and 5 controls the amount of feed flowing from the bin 14 into the receiving trough 24 by controlling the placement of a trough beneath the opening 25 of the bin.

The normal feed for poultry is in the form of seed, mash, or the like, and possesses sufficient of the properties of a fluid that it will flow from the storage bin into the receiving trough 24 but like other granular or powdered materials the amount will be dependent upon the distance between the opening 25 and the bottom of the feeding trough and upon the normal angle of repose of the feed material.

The lower end of the release shaft 60 is pivotably affixed to the lever 62 which is journaled to the shaft 28. The lever 62 is provided adjacent the release shaft 60 with a wing 62A through which it is connected by the bolt 63 to a likewing 64A of a second lever 64. The second lever 64 is rigidly affixed to the shaft 28 by the set screw 65. By adjustment of the bolt 63 the relative angular position of the shaft 28 may be altered with respect to the release shaft 60 by a degree of rotation measured by the arc subtended by the bolt 63. By adjusting the axle 28 in this manner the receiving trough 24 may be pivoted slightly beneath the opening 25 so as to receive more or less feed from the bin 14.

A leaf spring 68 is affixed to the boss 69 mounted on the framework 10 as shown in Figs. 3 and 4. The leaf spring functions to exert a transverse thrust on the shaft 60 for the purposes hereinafter described.

To deposit feed in the troughs 32 and 33 the shafts 26 and 27 are permitted to rotate about the axle 28, the weight of the feed in the trough 24 overcoming the counter-balance 30 when the arm 26 is released whereby the receiving trough 24 swings downwardly, and discharges into the troughs 32 and 33. The discharging position of the trough 24 is shown by dotted lines in Fig. 2. The hip or ridge 34 running between the troughs 32 and 33 is so positioned with relation to the discharge rotation of the receiving trough 24 that the two troughs 32 and 33 receive substantially equal proportions of the feed discharged from the trough 24. To permit adjustment of this feed distribution the ridge 34 is constructed in a preferred embodiment of two separate members 34A and 34B (Fig. 3). The member 34A is rigidly mounted and the member 34B is slidably mounted so that its upper edge may project above and partly over the member 34A. By simple adjustment of the position of this member 34B the ratio of feed received by the two troughs 32 and 33 may be adjusted at will. The same distribution control may be obtained by mounting an adjustable wing board along the edge of the hip 34. This is not a necessary feature of the invention and serves only to give greater flexibility to the operation of the feeding apparatus.

As shown in Figs. 6 and 7, automatic means are provided for actuating the release arm 60. The weight of feed contained in the trough 24 is sufficient to overcome the weight of the counter-balance 30 but rotation of the support arms 26 and 27 is prevented by the release shaft 60 until the same is permitted to fall freely. At such time as the release shaft 60 is allowed to move downwardly the weight of the feed in the trough 24 will cause the support arms to rotate with the axle 28 and permit the discharge of the feed as above described.

Referring to Fig. 6 which is a plan view of the control apparatus and Fig. 7 which is an elevation view taken on the line 7—7 of Fig. 6 the apparatus is shown to be enclosed within the housing 72 mounted on one end of the framework 10. The housing 72 comprises the side members 72A and 72B (see Fig. 1) and the bottom 72C and is conveniently supported by the brackets 73 and 73A which as shown in Fig. 3 may conveniently be formed integrally with the respective sides 72A and 72B of the housing 72. The timer for the control mechanism is preferably a conventional alarm clock 74 mounted on the floor 72C of the housing and having the customary time winding key 75 and alarm winding key 76. The shafts 78 and 79 are affixed to the winding keys 75 and 76 respectively by means of the cleats 80 and 81. The cleats 80 and 81, as shown in Fig. 6, are conveniently cylindrical members slotted to fit over the keys 75 and 76 and adapted to receive the shafts 78 and 79. It is to be understood that any means of joining the shafts 78 and 79 to the winding keys of the clock is within the contemplation of the invention. The opposite ends of the shafts 78 and 79 are journaled in the housing 10 so as to permit rotation thereof with the rotation of the winding keys 75 and 76.

Referring more particularly to Fig. 7 which is an elevation of the control apparatus taken on the line 7—7 of Fig. 6, a four pointed lifting cam 84 is mounted on the shaft 79 and a five pointed lifting cam 85 is mounted on the shaft 78. The support frame 87 is joined to the side of the framework 10 by the screws 88 and 89 and forms a bracket through which the shaft 79 is journaled. In this and the following modification of the control mechanism the cam 85 may be mounted on a shaft rotatable by the time winding key 75, as shown, or alternatively the cam may be mounted directly on the key. In this latter case the shaft 78 can be eliminated.

The release shaft 60 projects upwardly from its point of attachment to the lever 62 (Fig. 5) through an opening 90 in floor 72C of the housing 72 past the cam 84. The shaft 60 is notched at 92 and a dog 93 mounted on the floor 72C projects into the opening 90 (Fig. 7) engaging the notch 92 in the shaft 60.

The clock 74 is set so that the alarm will go off at a preselected time. At such time, the alarm key 76 will begin to unwind and the cam 84 will be caused to rotate. The rotation of the cam will cause one of the points such as the point 84A to engage the shaft 60 pushing the same toward the right so as to release it from the dog 93. When the shaft is thus freed from the dog 93 it will be free to drop permitting the discharge of the feed from the receiving trough 24 as above described. While the point 84A of the cam 84 is engaging the shaft 60 the point 84B will engage the arm 94 which is rigidly affixed to the arm 95, the two being pivoted at 96 to the framework 10. Depression of the arm 94 by the point 84B of the cam 85 will cause the rotation of the roller 97, journaled on the end of the arm 95, into the path of the point 84C thereby preventing continued rotation of the cam 84.

As is well known a conventional alarm clock requires considerable time to adjust itself when the alarm is turned off before complete unwinding. In some clocks this adjusting period may be as great as an hour and one-half. If the alarm winding key is released during this period the alarm will again sound. For this reason means are provided for delaying the withdrawal of the roller 97 from the path of the cam 84, for a time at least equal to the adjustment period of the clock 74. These means comprise a second cam 85 mounted on the shaft 78 and operable by the time winding key 75 of the clock. This cam 85 is positioned to operate the cantilever 100 which comprises the follower 101 and the lever arm 102 joined to each other by the web 103 and pivotally mounted to the housing at the point 104. Web 103 is affixed to the cam follower 101 and the lever arm 102 is joined thereto by means of the dog 106. The dog 106 is pivotally mounted to the boss 109 on the lever arm 102 and is provided with a release lever 110 operable as hereinafter described. As is shown the dog 106 is spring loaded by the spring 112 so that it will engage the notch 107 in the web 103. The cantilever 100 is spring loaded by the spring 113 in opposition to the action of the cam 105.

After the cam 84 has rotated and the point 84B has depressed the arm 94 causing the hold back dog or roller 97 to rotate into a position to engage the approaching spline 84C, rotation of the cam 85 will displace the cam follower 101 to the right as shown in Fig. 7. This displacement will be brought about by the point 85A in the cycle as described and will equal the displacement caused by the spline 85B as shown in Fig. 7. When thus displaced the cam follower 101 causes the rotation of the lever arm 102 which engages the arm 94 returning it to the position shown in Fig. 7. As soon as the follower 101 passes the peak of the spline 85A the spring 113 will function to withdraw the lever 102 and hold the follower 101 against the surface of the spline 85C. The return of the arm 94 to the position shown in Fig. 7 will also return the hold back dog 97 to the position shown in Fig. 7 and the control apparatus will be in position to repeat the above cycle.

Immediately after the feed has been discharged from the trough 24 the counter-weight 30 will cause the counter-rotation of the support arms 26 and 27 returning the release shaft to the position shown in Fig. 7. The spring 68 (Figs. 3 and 4) pushes the shaft 60 towards the left so that the dog 93 will engage the notch 92 therein. In this fashion the apparatus has been returned to equilibrium and the feeding trough 24 will be again filled from the bin 14 and will not be released to discharge into the troughs 32 and 33 until the alarm again goes off after a twelve hour interval.

Occasionally it will be found that the cam follower 101 will be disposed adjacent one of the points 85A, 85B, etc., of the cam 85 just at the stage in the cycle when the alarm goes off. Inasmuch as this could prevent the displacement of the arm 94 and the rotation of the hold back dog 97 into the path of the cam 84 provision is made whereby the lever 102 is released from engagement with the cam follower 101 by the dropping of the release shaft 60. This means comprises the pin 115 projecting from the shaft 60 and adapted to engage the lever 110 connected to the dog 106 when the shaft 60 is caused to drop by the cam 84. The release of the dog 106 in this manner disengages the lever arm 102 from the cam follower 101 permitting it to drop back against the stop 116 projecting from the bracket 87. When the cam follower 101 passes the particular point of the cam 85, the spring 113 retracts the cam follower 101 and the web 103 so that the dog 106 engages the notch 107 and the cantilever 100 is ready for operation as described.

A modification of the control mechanism shown in Figs. 6 and 7 is shown in partial elevation in Fig. 8. In the modification of Fig. 8 the cams 84 and 85 are the same as the like cams in the modification of Fig. 7 and are operated by the clock 74 in the same manner. The control rod 60 is similarly released from the dog 93 by the rotation of the cam 84 when the alarm goes off. Continued rotation of the cam 84 is prevented by the hold back dog 97 and the apparatus is reset by the cantilever 100. However, in the embodiments shown in Fig. 8 the hold back dog 97 is suspended from a shaft 120 pivotably affixed to the housing 10 by the pin 121. One end 122A of toggle joint 122 is pivotably affixed to the suspension arm 120 at the pivot point 124. The other end 122B of the toggle joint 122 is affixed to the lever arm 126 which is similar to the lever arm 94 in the embodiment shown in Fig. 7, differing therefrom in being somewhat shorter. The lever arm and toggle 122B are pivotably affixed to the framework 10 at 128. Spring 130 exerts a restoring force on the toggle 122B tending to hold the joint. The construction of this toggle arrangement is shown in the elevation view of Fig. 9. In the position shown in Fig. 8, the hold back dog 97 interferes with the rotation of the cam 84 when point 84C engages the dog 97. When the alarm sounds the rotation of the cam 84 will cause the point 84B to disengage the release shaft 60 from the dog 93, permitting the unloading of the receiving trough 24. Continued rotation of the cam 84, however, will be prevented by the dog 97. Thereafter, as the cam 85 rotates, the cam following arm 101 of the cantilever 100 will be displaced towards the right causing the lever arm 102 to exert an upward force on the lever 126, thereby buckling the toggle 122 and withdrawing the dog 97 from the path of the cam 84. The rate of rotation of the cam 85 is such that withdrawal of the dog 97 is delayed sufficiently to allow the clock to adjust itself to the stopping of the alarm, so that removal of the dog from the path of the cam 84 will not cause the alarm to sound again. The point 84C which was in engagement with the dog 97 springs past the dog when it is thus retracted, as a result of the tension developed when the cam was stopped by the dog. Thus in the sequence as described above, when the cam 84C hits the dog 97, a certain tension will be built up by the alarm spring. When the dog 97 is withdrawn from the path of the point 84C, as described, the cam 84 will rotate sufficiently to place the point 84C in the position of the point 84B in Fig. 8. However, this tension will not be sufficient to cause the cam 84 to disengage the shaft 60 against the force of the spring 68 (Figs. 3 and 4). After the cam following arm 101 passes one of the peaks of the cam 85, the cantilever 100 will return to the position shown, and the spring 130 will restore the toggle 122 to the closed position, again placing the dog 97 in the path of the next succeeding point on the cam 84.

As in the preceding embodiment of the invention, the sequence may be such that the cam following arm 101 will be in a displaced position at the particular instant when the alarm is sounded. In this position, as above described, the hold back dog 97 is retracted from the path of the cam 84, and means are preferably provided for preventing the complete unwinding of the alarm. As in the preceding embodiment, this means comprises the trip lever 110 which is tripped by the falling of the shaft 60 and which releases the dog 106 from the web 103 retracting the lever 102 and permitting the closing of toggle joint 122.

The stop 116 is provided to limit the retraction of the lever 102 so that the spring 113 can cause the dog 106 to again engage the notch 107 in the web.

An additional embodiment of the invention is shown in the partial elevation view of Fig. 10. In this embodiment the rotation of cam 84 is again regulated by the hold back dog 97, which, after allowance of time for the alarm clock to adjust itself, is retracted from the path of the cam 84 by the action of the cam 85, to permit the cam 84 to rotate sufficiently for the engaging point to pass the dog 97. The dog 97 is again suspended from a pivotable arm 120 and is controlled by the toggle 122 which is provided with the spring 130 tending to hold the toggle in the closed position. In the embodiment shown in Fig. 10 the toggle 122 is pivotably mounted at 128. The cantilever 100 again controls the position of the dog 97 by its action on the toggle 122 depending on the rotation of the cam 85. In this embodiment, the cam following arm 101 is mounted to an arm 101A of the cantilever at 130, and is adjustable by the adjustment screw 131 threaded through the arm 101A and engaging the cam following arm 101. The toggle 122 is buckled by displacement of the member 122A by the dog 106. This is accomplished when the cam following arm 101 is displaced by one of the points of the cam 85, which causes the lever arm 102 to rotate upwardly whereby the dog 106 engages the arm 122A of the toggle 122.

When the hold back dog 97 is thus withdrawn from the path of the cam 84, tension thereon will cause the particular point held by the dog to pass thereby before the dog is returned to the position shown in Fig. 10. In the embodiment here shown, the web 103 is notched at 134 to permit the shaft 78 and the cam 85 to pass therethrough. The notch 134 is curved on a radius taken from the point of mounting 104 of the cantilever to permit the same to rotate without interfering with the shaft 78. As hereinbefore pointed out the cam 85 may be mounted directly on the winding key. This type of mounting is particularly suited to the mechanism of Fig. 10.

As in the foregoing embodiments, means are provided for releasing the lever arm 102 from the web 103 in cases where the cam following arm 101 is in the extreme position coincident with the sounding of the alarm so as to permit the toggle 122 to close and return the hold back dog 97 into the path of the cam 84. These means again include a pin on the release shaft 60 which engages the arm 110 of the dog 106, releasing the dog from the notch 107 of the web. The stop pin 136 limits the fall of the arm 102 so that upon the downward rotation of the web 103, accompanying the return of the cam following arm 101 towards the center of the cam 85, the dog 106 will again engage the notch 107.

An alarm spring on a conventional alarm clock permits at least three complete revolutions of the arm winder. Thus by limiting the revolution of the cam 84 affixed to the alarm winder to one-quarter of a turn for each actuation of the feeding device, one winding of the alarm will be sufficient for approximately twelve feeding periods or six days. This feature is particularly convenient when the alarm employed is a six-day or seven-day clock, whereby the alarm spring and the time spring may be wound at the same time in approximately six-day intervals. As shown in Fig. 6, the only mechanical engagement of the clock with the control mechanism is through the cleats 81 and 80. Therefore to rewind the clock it is removed from these cleats; a simple and quick operation.

As shown in Fig. 6, the setting knob 140 is accessible when the apparatus is in operation and the clock may be reset at any time. Similarly, the alarm control button 142 is exposed and if it is desired to shut off the device or eliminate any particular feeding, the alarm may be shut off by means of the button 142. If the alarm is shut off in this fashion, it follows that the cam 84 will not be actuated and the receiving trough 24 will not be dumped until the alarm is again turned on.

Having described and illustrated the feeding apparatus of the invention, it will be understood that many modifications may be made therein without departure from the scope of the invention. Although particularly suited to the feeding of poultry, including chickens, turkeys, etc., and other fowl, the device is also adapted to the feeding of any other animals and by merely changing the size of the apparatus and the character of the feed employed, substantially any type of animal may be fed thereby.

I claim:

1. An apparatus of the class described comprising a framework, a feed storage bin located in the upper part of the framework, said storage bin having an outlet opening along the bottom of the bin, a pair of parallel feeding troughs located in the lower part of the framework below and parallel to the storage bin, a receiving trough pivotably mounted beneath the storage bin and adapted to receive feed from said opening, catch means for preventing the receiving trough from pivoting under the weight of feed received therein, control means actuated by a clock for releasing the catch means at a preselected time to permit the receiving trough to pivot and discharge feed into the feeding troughs, and a counterweight attached to said receiving trough to pivot it back into its feed receiving position beneath the bin outlet after the feed is discharged into the feeding troughs.

2. An apparatus according to claim 1 wherein the feed troughs are so positioned with respect to the receiving trough as to each receive substantially equal proportions of the feed discharged from the feeding trough.

3. An apparatus of the class described comprising a feed storage bin having a discharge opening, a trough located beneath the storage bin, a receiving trough pivotably mounted beneath the opening of the storage bin between the storage bin and the feeding trough, and adapted to receive feed from said opening, a shaft operatively associated with the receiving trough and projecting upwardly therefrom, a counterbalance attached to the receiving trough holding it in feed receiving relationship with said opening when the receiving trough has no feed in it, but being overbalanced by the receiving trough when the latter is substantially filled with feed, a catch engageable in a notch in the shaft for holding the shaft so as to prevent the rotation of the receiving trough to its discharging position and control means actuated by a clock for disengaging the shaft from the catch means at a preselected time.

4. An apparatus according to claim 3 wherein the receiving trough runs longitudinally under the storage bin and is mounted at either end to a support arm, the support arms being pivotably mounted intermediate their ends, and a counterweight disposed parallel to the receiving trough and affixed to the support arms.

5. An apparatus according to claim 3 wherein the control means for disengaging the shaft from the catch means comprises a clock, a first cam rotatable by the alarm winder of the clock and a second cam rotatable by the time winder of the clock, the first cam being so positioned with respect to the shaft that rotation thereof will disengage the shaft from the catch means, a movable stop in association with the first cam to limit the degree of rotation of the first cam and means operably associated with the second cam for withdrawing said last named means from the path of the first cam.

6. An apparatus according to claim 3 wherein the shaft is operatively connected to the receiving trough in pivotable relationship and means for regulating the angular relationship of the shaft and the receiving trough so as to control the amount of feed flowing from the storage bin into the feeding trough.

7. In a poultry feeding apparatus comprising a storage bin adapted to discharge into a receiving trough pivotably mounted with respect to the storage bin and feeding troughs disposed beneath the receiving trough and adapted to receive feed discharged from the receiving trough, means for controlling the pivoting of the receiving trough which comprises a shaft operatively connected to the receiving trough and projecting therefrom to control means which comprises a catch engageable in a notch in said shaft, a clock, a first cam rotatable by the alarm spring of the clock and adapted to disengage the shaft from the catch, the first cam having four points each adapted to disengage the shaft from the catch means, stop means in association with the first cam for stopping the rotation of the first cam after each point has engaged the shaft, the stop means being moved within the path of the first cam by one of the points of the first cam, a second cam operable by the time spring of the clock and means in association with the second cam for removing the stop means from the path of the first cam.

8. An apparatus of the class described comprising an elongated feed storage bin, having an opening extending along the bottom thereof, a pair of parallel feeding troughs located beneath the storage bin, a receiving trough supported beneath the opening in the storage bin by a pair of supporting arms affixed to opposite ends of a pivotable elongated axle, a counterweight supported between the support arms, a release shaft connected to the axle so that rotation of the axle is accompanied by vertical motion of the shaft, a catch adapted to engage a notch in the shaft so as to prevent vertical motion thereof, and control means operable to periodically disengage the shaft from the catch.

9. An apparatus according to claim 8 wherein the control means comprises an alarm clock having an alarm winder and a time winder, means operable by rotation of the alarm winder for disengaging the shaft from the catch, a movable stop adapted to prevent continued rotation of the alarm winder after the shaft has been disengaged from the catch and means operable by the time winder to move the stop so as to permit rotation of the alarm winder.

10. An apparatus according to claim 8 wherein the control means comprises an alarm clock having an alarm winder and a time winder, a shaft connected to and rotatable by the alarm winder, a second shaft connected to and rotatable by the time winder, a first cam mounted on the first shaft and shaped so as to disengage the release shaft from the catch upon rotation thereof, a stop pivotably mounted with respect to the first cam and provided with a lever arm engageable by the first cam whereby rotation thereof will cause the stop to rotate into the path of the first cam and prevent continued rotation thereof, a second cam mounted on the second shaft, a cantilever comprising a cam following arm riding on the second cam and a lever arm engageable with the lever arm associated with the stop, the second cam being so shaped that rotation thereof will rotate the cantilever and engage the lever arm thereof with the lever arm of the stop so as to move the stop from the path of the first cam.

11. An apparatus according to claim 8 wherein the control means comprising an alarm clock having an alarm winder and a time winder, a first cam mounted to the alarm winder so as to rotate upon rotation of the alarm winder, a second cam mounted to the time winder so as to rotate upon rotation of the time winder, the first cam being so shaped as to disengage the release shaft from the catch upon rotation thereof, a stop pivotably suspended in the path of the first cam so as to prevent rotation thereof after disengagement of the release shaft thereby, a toggle pivotably mounted at one end to the stop and pivotably anchored at the other end, a lever arm associated with the toggle, a cantilever pivotably anchored at its vertex and having a cam following arm adapted to ride on the periphery of the second cam and a lever arm pivotable by the cam following arm and adapted to engage the lever arm of the toggle, the second cam being so shaped that rotation thereof displaces the cam following arm so as to cause the lever arm of the cantilever to engage the lever arm of the toggle whereby the toggle is buckled and the stop is withdrawn from the path of the first cam.

12. An apparatus according to claim 8 wherein the control means comprises an alarm clock having an alarm winder and a time winder, a first cam affixed to the alarm winder so that rotation of the alarm winder will cause the first cam to rotate, a second cam affixed to the time winder so that rotation of the time winder will cause the second cam to rotate, the first cam being so shaped that rotation thereof will disengage the release shaft from the catch, a stop pivotably suspended in the path of the first cam, a toggle pivotably affixed at one end to the stop and pivotably anchored at the opposite end, a cantilever pivotably anchored and comprising a cam following arm adapted to ride on the periphery of the second cam and adjustable thereon with relation to the cantilever and the second cam being so shaped that rotation thereof will displace the cantilever so as to cause the lever arm to break the toggle joint thereby withdrawing the stop from the path of the first cam.

13. An apparatus of the class described comprising an elongated feed storage bin, having an opening extending along the bottom thereof, a pair of parallel feeding troughs located beneath the storage bin, a receiving trough supported beneath the opening in the storage bin by a pair of supporting arms affixed to opposite ends of a pivotable elongated axle, a counter-weight supported between the support arms, a release shaft connected to the axle so that rotation of the axle causes vertical motion of the shaft, a catch adapted to engage a notch in the shaft so as to prevent vertical motion thereof, an alarm clock having an alarm winder and a time winder, a first cam rotatable by the alarm winder, a second cam rotatable by the time winder, the first cam being so shaped that rotation thereof disengages the release shaft from the catch, a stop member in the path of the first cam so as to prevent rotation thereof after disengagement of the release shaft, a cantilever comprising a cam following arm adapted to ride on a second cam and a lever arm pivoted by the cam following arm the second cam being shaped so that rotation thereof causes the cantilever to retract the stop member from the path of the first cam.

14. An apparatus according to claim 13 wherein the cam following arm and the lever arm are separated by a web joined to the cam following arm, a dog pivotably mounted to the lever arm and adapted to engage a notch in the web so as to hold the lever arm to the web.

15. An apparatus according to claim 14 wherein the release shaft has a pin projecting from the upper portion adapted to disengage the dog from the notch when the release shaft is released if the cantilever is in a position to retract the stop.

16. An apparatus according to claim 13 wherein the first cam is a four pointed lifting cam and the second cam is a five pointed lifting cam.

17. Feeding apparatus comprising a storage bin for feed, said storage bin having an outlet for gravity feed, a receiving trough normally positioned beneath said outlet and receiving feed from the outlet, said receiving trough being mounted on a pivot and provided with a counterbalance which normally holds said receiving trough in position to receive feed from said outlet, but the weight of said counterbalance being overcome by the weight of said receiving trough when the latter is substantially filled with feed so that the receiving trough will be urged to pivot downward and thus discharge the feed contained therein, a feeding trough positioned beneath the receiving trough to receive the feed discharged from the receiving trough when the latter is pivoted downward, a catch means normally holding the receiving trough up in receiving position beneath the bin outlet both when filled and unfilled with feed, and timed means tripping the catch means to allow the receiving means to pivot downward when substantially filled with feed to discharge the feed into the feeding trough.

18. Apparatus according to claim 17, in which the outlet from the bin terminates within the receiving trough when the latter is in feed receiving position so that when the receiving trough fills with feed, the feed piles up around the outlet of the bin, thereby preventing further discharge of feed from the bin until the receiving trough is discharged of its feed.

19. An apparatus of the class described comprising a framework, a feed storage bin located in the upper part of the framework, a pair of parallel feeding troughs located in the lower part of the framework below and parallel to the storage bin, a receiving trough pivotably mounted beneath the storage bin and adapted to receive feed from an opening along the bottom of the bin, catch means for preventing the receiving trough from pivoting, and control means actuated by a clock for releasing the catch means at a preselected time to permit the receiving trough to rotate and discharge feed into the feeding troughs, said receiving trough being affixed to supporting arms pivoted to the framework and provided with a counter-weight adapted to return the receiving trough to its receiving position after the feed has been discharged therefrom.

20. An apparatus of the class described comprising a framework, a feed storage bin located in the upper part of the framework, a pair of parallel feeding troughs located in the lower part of the framework below and parallel to the storage bin, a receiving trough pivotably mounted beneath the storage bin and adapted to receive feed from an opening along the bottom of the bin, catch means for preventing the receiving trough from pivoting, and control means actuated by a clock for releasing the catch means at a preselected time to permit the receiving trough to rotate and discharge feed into the feeding troughs, and a separate guard pivoted to the framework above each of the feeding troughs, the separate guards being connected to each other in such fashion as to prevent access to both feeding troughs at the same time, and an agitator located within the feed storage bin and connected by means of a lever to one of the guards.

LEONARD P. KNARREBORG.

REFERENCES CITED

The following references are of record in the file of this patent:

UNITED STATES PATENTS

| Number | Name | Date |
|---|---|---|
| 461,457 | Terry | Oct. 20, 1891 |
| 849,169 | Stein | Apr. 2, 1907 |

FOREIGN PATENTS

| Number | Country | Date |
|---|---|---|
| 295,107 | Great Britain | Aug. 9, 1928 |